United States Patent [19]

Takai et al.

[11] Patent Number: 5,681,455
[45] Date of Patent: Oct. 28, 1997

[54] FLOWING-DOWN RAINWATER FLOW-SEPARATING PIPE

[75] Inventors: Seiichiro Takai, Tokyo; Masuji Oi, 391-7, Higashi-koiso, Ohiso-machi, Naka-gun, Kanagawa 255, both of Japan

[73] Assignees: Totetu Mfg. Co., Ltd., Tokyo; Masuji Oi, Kanagawa, both of Japan

[21] Appl. No.: 612,846

[22] PCT Filed: Jul. 25, 1995

[86] PCT No.: PCT/JP95/01474

§ 371 Date: Apr. 11, 1996

§ 102(e) Date: Apr. 11, 1996

[87] PCT Pub. No.: WO96/03553

PCT Pub. Date: Feb. 8, 1996

[30] Foreign Application Priority Data

Jul. 26, 1994 [JP] Japan .................. 6-174026

[51] Int. Cl.⁶ .................. E03B 3/03; E03F 1/00
[52] U.S. Cl. .................. 210/154; 210/162; 210/170; 210/172; 52/16
[58] Field of Search .................. 210/154, 162, 210/170, 172; 52/16

[56] References Cited

U.S. PATENT DOCUMENTS

| | | | |
|---|---|---|---|
| 2,494,780 | 1/1950 | Schmidt | 210/162 |
| 4,578,188 | 3/1986 | Cousino | 210/170 |
| 4,801,377 | 1/1989 | Bolt | 210/162 |
| 5,114,594 | 5/1992 | Rosebrock et al. | 210/154 |
| 5,452,546 | 9/1995 | Goddard | 52/16 |

FOREIGN PATENT DOCUMENTS

| | | |
|---|---|---|
| 2908620 | 9/1980 | Germany . |
| 3139304 | 4/1983 | Germany . |
| 54-140320 | 2/1978 | Japan . |
| 64-83738 | 3/1989 | Japan . |
| 2-18559 | 2/1990 | Japan . |
| 2249388 | 6/1992 | United Kingdom . |

*Primary Examiner*—Christopher Upton
*Attorney, Agent, or Firm*—McAulay Fisher Nissen Goldberg & Kiel, LLP

[57] ABSTRACT

An upper end of an outer pipe 16 is connected to a gutter, and a lower end of the outer pipe is connected to a water collecting box communicating with a sewer pipe. An inner pipe 18 which is arranged apart from an inner circumferential surface of a vertical portion 16d of the outer pipe at an outer circumferential edge of an upper portion thereof is connected to a storage-percolating box at a lower end thereof. A ring-like flow-separating piece 24 is disposed on an inner circumferential surface of the vertical portion of the outer pipe above an outer end of the inner pipe by a predetermined distance. The flow-separating piece comprises a ring-like concave groove 24a for receiving rainwater flowing down along the inner circumferential surface of the vertical portion of the outer pipe, a plurality of through holes 24b formed on a bottom portion of the concave groove so as to be juxtaposed in a circumferential direction for guiding the rainwater received in the concave groove to the water collecting box, and an inner circumferential wall 24c formed in such a taper as that an inner diameter thereof decreases toward the lower end for guiding the rainwater overflowing from the concave groove to the inner pipe.

9 Claims, 6 Drawing Sheets

FLOWING-DOWN RAINWATER FLOW-SEPARATING PIPE

TECHNICAL FIELD

The present invention relates to a flow-separating pipe for flow-separating rainwater dropping on a roof or a housetop of a building into the rainwater flowing into a sewer pipe and the rainwater stored in a storage-percolating box or a storage vessel.

BACKGROUND ART

As such a rainwater flow-separating pipe, one of the inventors filed a patent application relating to a flowing-down rainwater flow-separating pipe comprising an outer pipe and an inner pipe disposed in the outer pipe (Unexamined Published Japanese Patent Application No. 64-83738). A vertical potion is formed on the outer pipe, and an upper end of the outer pipe is connected to a gutter. A lower end of the outer pipe is connected to a water collecting box communicating with the sewer pipe. An outer circumferential edge of an upper end of the inner pipe is arranged apart from an inner circumferential surface of the vertical portion at a predetermined distance. A lower end of the inner pipe is connected to a rainwater storage-percolating box. In this flow-separating pipe, an inner diameter of one part of the vertical portion of the outer pipe is formed so as to change continuously, and an upper portion of the inner pipe is positioned movably in the vertical direction, so that the above-mentioned distance is adjusted. An opening potion is disposed on the outer pipe in the vicinity of the upper end of the inner end. An opening and closing lid is disposed on the opening portion.

In this flow-separating pipe, the rainwater flowing-down from the gutter flows down in a laminate manner while it adheres to an inner circumferential surface of the vertical portion of the outer pipe. On the light rain and the middle rain in which the strength of the raining (mm/hour) does not exceed the flowing capacity of the sewer pipe and the rivers, a thickness of the layer of the rainwater flowing down on the inner circumferential surface of the vertical portion is less than a distance between the outer circumferential edge of the upper end of the inner pipe and the inner circumferential surface of the vertical portion, so that the rainwater flows down only in the outer pipe to flow to the sewer pipe through the water collecting box, and does not flow into the inner pipe.

On the heavy rain in which the strength of the raining exceeds the flowing capacity of the sewer pipe and the like, the thickness of the layer of the rainwater flowing on the inner circumferential surface of the vertical portion become larger than the above-mentioned distance, so that the rainwater flows into the inner pipe also. The rainwater flowing into the storage-percolating box is temporarily stored in this box, and then percolates into the earth to be dispersed thereto.

As a result, only when the strength of the raining exceeds the flowing capacity of the sewer pipe and the rivers, the rainwater from the gutter can be flow-separated into the storage-percolating box, and the device can be made into a simple construction to be arranged in a small space in the gutter, and the sand and the micro dust which enter into the rainwater from the gutter can be removed to prevent the blinding of the storage-percolating box.

However, the gutter for the roof having an area of, for example, 50 m² has been actually connected to the outer pipe of the above-mentioned flowing-down rainwater flow-separating pipe, a speed and a thickness of the flow of the rainwater has been measured when it rains on the roof at the strength of the raining of about 10 mm/hour. As a result, the flow speed of the rainwater has been about 2 to 3 m/sec. The thickness of the layer of the rainwater flowing down while adhering to the inner circumferential surface of the outer pipe has been about 0.5 mm. Therefore, it is difficult to flow-separate the flow of the rainwater adhering to the inner circumferential surface of the outer pipe, since the thickness of the layer of the rainwater is small.

It is an object of the present invention to provide a flowing-down rainwater flow-separating pipe in which the blinding of the storage-percolating box and the contamination of the storage vessel can be prevented by flowing into a sewer pipe the rainwater including much sand and dust accumulated on a roof and a housetop, on a light rain at the beginning of raining, the rainwater can be flow-separated into the sewer pipe, and the storage-percolating box or the storage vessel automatically according to the strength of the raining, and an amount of the rainwater flowing into the sewer pipe and the rivers is prevented from exceeding the flowing capacity thereof.

Further, it is another object of the present invention to provide a flowing-down rainwater flow-separating pipe in which, in a case where a light rain continues after sand and dust accumulated on a roof and a housetop flow into a sewer pipe, the rainwater can be guided to a storage-percolating pipe, or a storage vessel, and the rainwater can be made to adhere to the inner circumferential surface of an outer pipe to flow-separate the rainwater surely even if a distance between a rainwater flow passage and a flow-separating pipe is short.

DISCLOSURE OF THE INVENTION

A construction of the present invention for attaining the above-mentioned object will be described hereinafter with reference to FIGS. 1, 5, 6 and 7 corresponding to an embodiment of the present invention.

Figure 1:
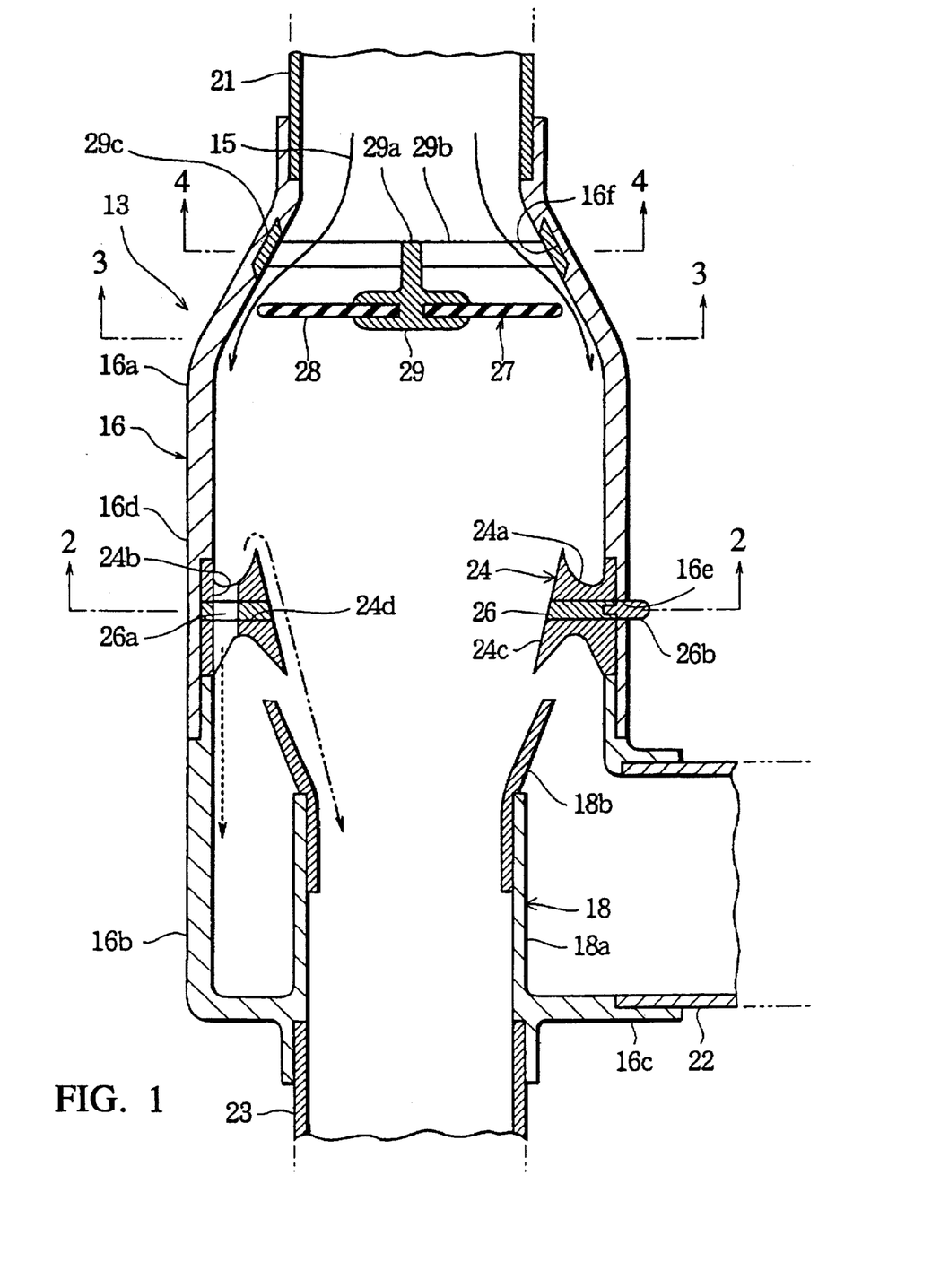
FIG. 1 is an enlarged section view of A part of FIG. 5 showing a flow-separating pipe of a flowing-down rainwater of a first embodiment of the present invention.
Figure 5:
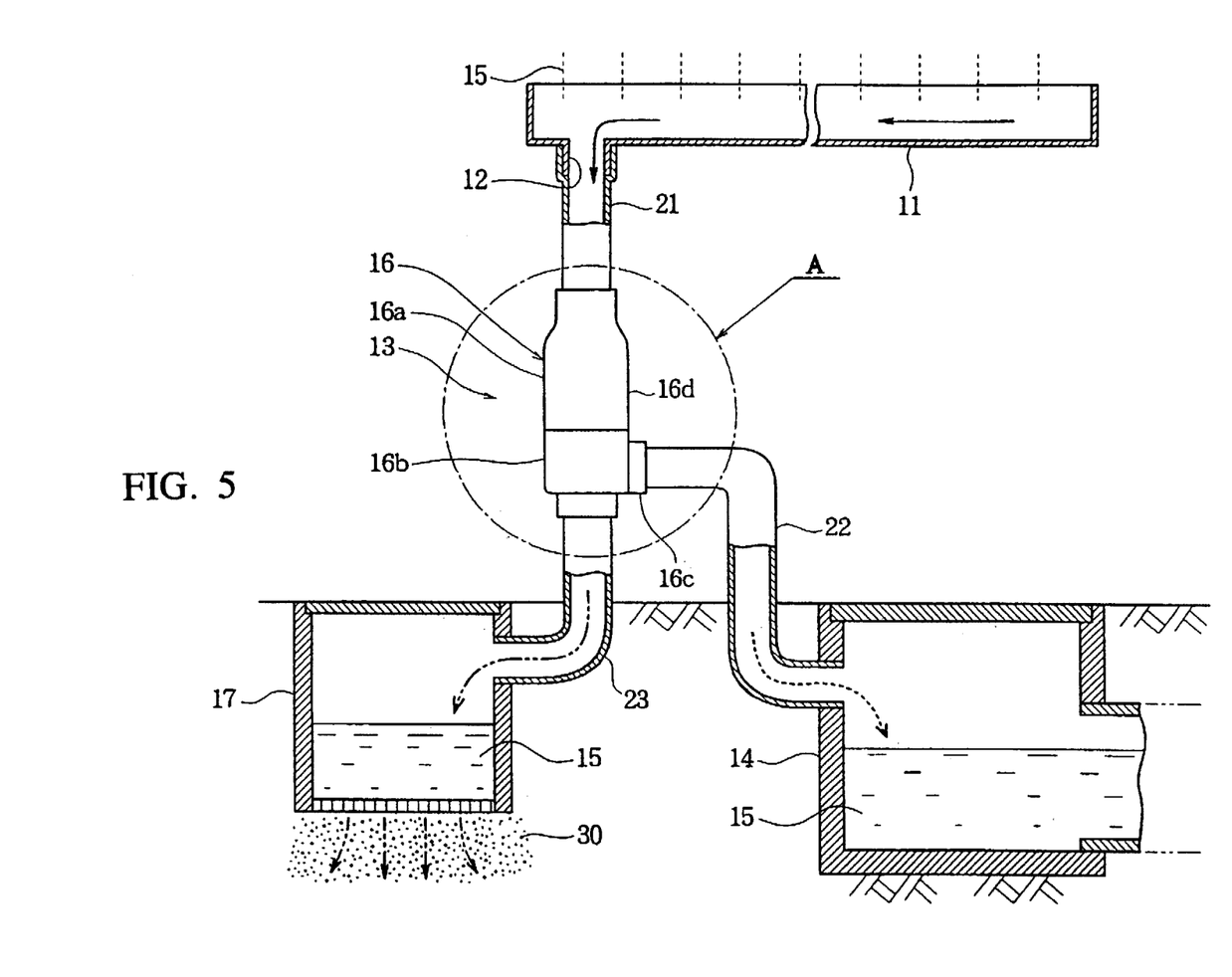
FIG. 5 is a constructional view showing a state in which the flow-separate pipe is connected to the gutter, the water collecting box and the storing and penetrating box.

As shown in FIGS. 1 and 5, a first flowing-down rainwater flow-separating pipe 13 according to the present invention comprises an outer pipe 16 having a vertical portion 16d, connected at an upper end thereof to a rainwater flow passage 11 for receiving rainwater 15 dropping on a roof or a housetop of a building, and connected at a lower end thereof to a water collecting box 14 communicating with a sewer pipe, an inner pipe 18 arranged apart from an inner circumferential surface of the vertical portion 16d at an outer circumferential surface of an upper portion thereof, and connected at a lower end thereof to any one or both of a storage-percolating box 17 for rainwater 15 or a storage vessel, and a ring-like flow-separating piece 24 disposed on the inner circumferential surface of the vertical portion 16d of the outer pipe 16 above an upper end of the inner pipe 18 by a predetermined distance.

The characteristic construction resides in that the flow-separating piece 24 comprises a ring-like concave groove 24a for receiving the rainwater 15 flowing down along the inner circumferential surface of the vertical portion 16d of the outer pipe 16, a plurality of through holes 24b formed on a bottom portion of the concave groove 24a so as to be juxtaposed in a circumferential direction for guiding the rainwater 15 received in the concave groove 24a to the water collecting box 14, and an inner circumferential wall 24c formed in such a taper as that an inner diameter thereof decreases toward the lower end for guiding the rainwater 15 overflowing from the concave groove 24a to the inner pipe 18.

In the flow-separating pipe 13, the rainwater 15 is guided spontaneously or by the current piece 27 from the rainwater flow passage 11 into the flow-separating pipe 13 together with sand and dust accumulated on the roof to thereby flow down as a flow adhering to the outer pipe 16, on a light rain at the beginning of raining. Since the rainwater 15 is a little in amount, all of the rainwater 14 flows into the sewer pipe through the through holes 24 and the water collecting box 14.

On the middle rain, a relatively clean rainwater 15 flowing into the flow-separating pipe 13 is flow-separated into the one passing through the through holes 24 and the one overflowing from the concave groove 24a and flowing into the inner pipe 18 along an inner circumferential wall 24c. The rainwater 15 passing through the through holes 24b flows into the sewer pipe through the water collecting box 14, and the rainwater 15 flowing into the inner pipe 18 is stored in a storage-penetrating box 17.

Also, if the strength of the raining does not become large and the light rain continues, the opening ratio of the through holes 24b is made small by operating an adjusting ring 26, so that the rainwater 15 overflows from the concave groove 24a to thereby flow into the inner pipe 18.

Also, if the strength of the raining does not become large and the light rain continues, the opening ratio of the through holes 24b is made small by operating an adjusting ring 26, so that the rainwater 15 overflows from the concave groove 24a to thereby flow into the inner pipe 18.

Figure 6:
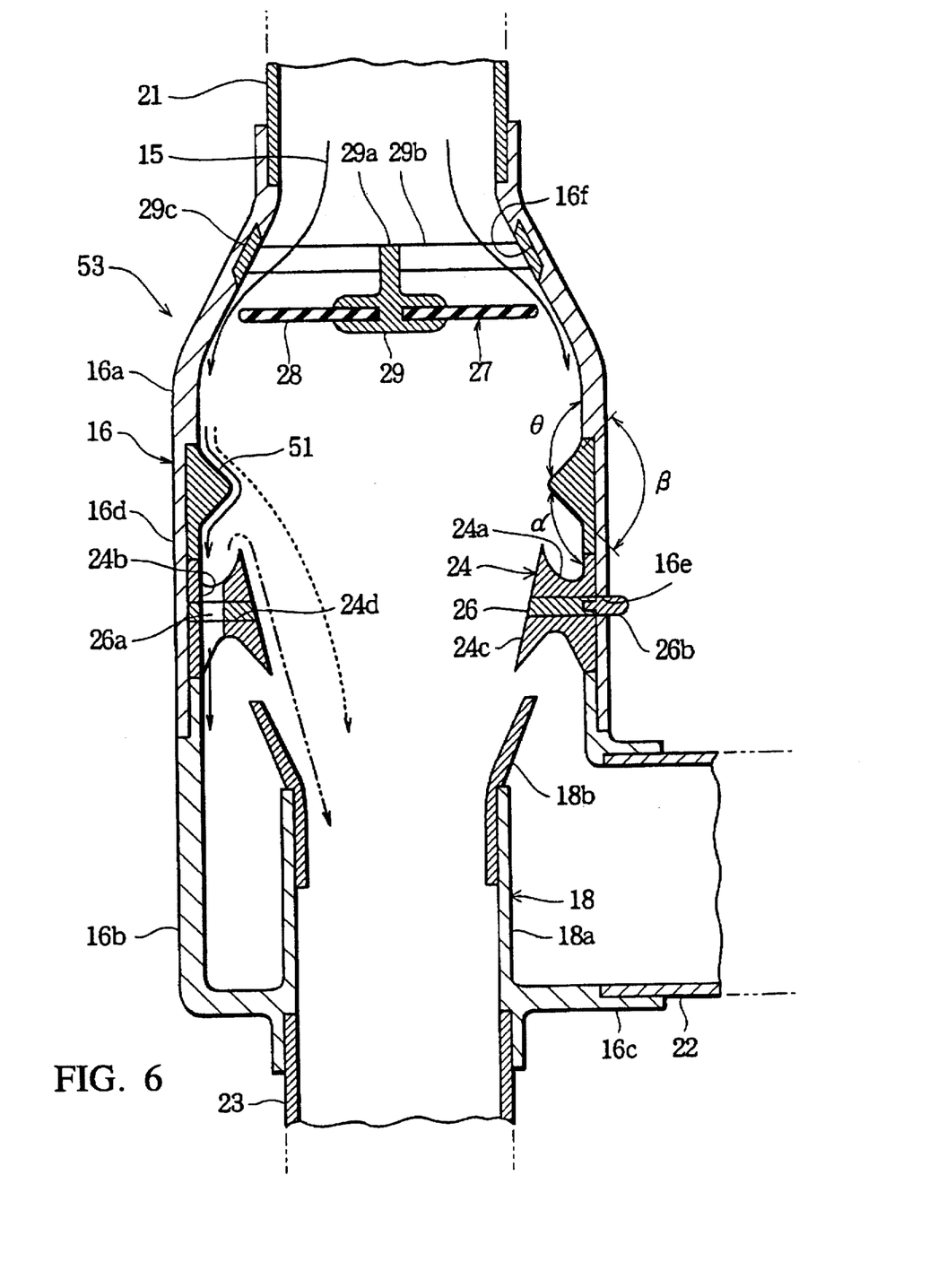
FIG. 6 is a sectional view of the second embodiment of the present invention corresponding to FIG. 1.

As shown in FIG. 6, a second flowing-down rainwater flow-separating pipe 53 according to the present invention comprises an outer pipe 16 having a vertical portion 16d, connected at an upper end thereof to a rainwater flow passage 11 for receiving rainwater 15 dropping on a roof or a housetop of a building, and connected at a lower end thereof to a water collecting box 14 communicating with a sewer pipe, an inner pipe 18 arranged apart from an inner circumferential surface of the vertical portion 16d at an outer circumferential surface of an upper portion thereof, and connected at a lower end thereof to any one or both of a storage-percolating box or a storage vessel, and a ring-like protrusion 51 disposed on an inner circumferential surface of the vertical portion 16d of the outer pipe 16 above an upper end of the inner pipe 18 by a predetermined distance.

The characteristic construction resides in that a ring-like flow-separating piece 24 is disposed on the inner circumferential surface of the vertical portion 16d of the outer pipe 16 above an upper end of the inner pipe 18 and below the protrusion 51, and the flow-separating piece 24 comprises a ring-like concave groove 24a for receiving the rainwater 15 flowing down along the inner circumferential surface of the vertical portion 16d of the outer pipe 16, a plurality of through holes 24b formed on a bottom portion of the concave groove 24a so as to be juxtaposed in a circumferential direction for guiding the rainwater 15 received in the concave groove 24a to the water collecting box, and an inner circumferential wall 24c formed in such a taper as that an inner diameter thereof decreases toward the lower end for guiding the rainwater 15 overflowing from the concave groove 24a to the inner pipe 18.

In the flow-separating pipe 53, the rainwater 15 is guided spontaneously or by the current piece 27 from the rainwater flow passage 11 into the flow-separating pipe 53 together with sand and dust accumulated on the roof to thereby flow down as a flow adhered to the outer pipe 16, on a light rain at the beginning of the raining. Further, the rainwater 15 flows down as it is as a flow adhering to the outer pipe 16 after it rides across the protrusion 51 also, and flows into the sewer pipe through the through holes 24b and the water collecting box.

On a middle rain, the rainwater 15 flowing into the flow-separating pipe 53 is flow-separated into an adhering flow of a constant amount flowing down while adhering to the inner circumferential surface of the outer pipe 16 even if the rainwater 15 rides across the protrusion 51, and a separating flow jumping at the protrusion, separating from the inner circumferential surface of the outer pipe 16 and flowing into the inner pipe 18. The rainwater 15 which becomes the adhering flow even if it rides across the protrusion 51 is further flow-separated into the one flowing into the sewer pipe through the through holes 24b and the water collecting box, and the one overflowing from the concave groove 24a to flow into the inner pipe 18. The rainwater 15 which becomes the separating flow is temporarily stored in the storage-percolating box through the inner pipe 18.

Further, when the strength of the raining becomes large to a heavy rain, all of the rainwater 15 flowing into the flow-separating pipe 53 jump at the protrusion 51 to separate from the inner circumferential surface of the vertical portion 16d, and then is stored in the storage-percolating box through the inner pipe 18.

Further, as shown in FIGS. 1 and 6, it is preferable that a slit 24d crossing through holes 24b in the circumferential direction is disposed on the flow-separating piece 24, and an adjusting ring 26 which can adjust an opening ratio of the through holes 24b is inserted rotatably into the slit 24d.

Figure 7:
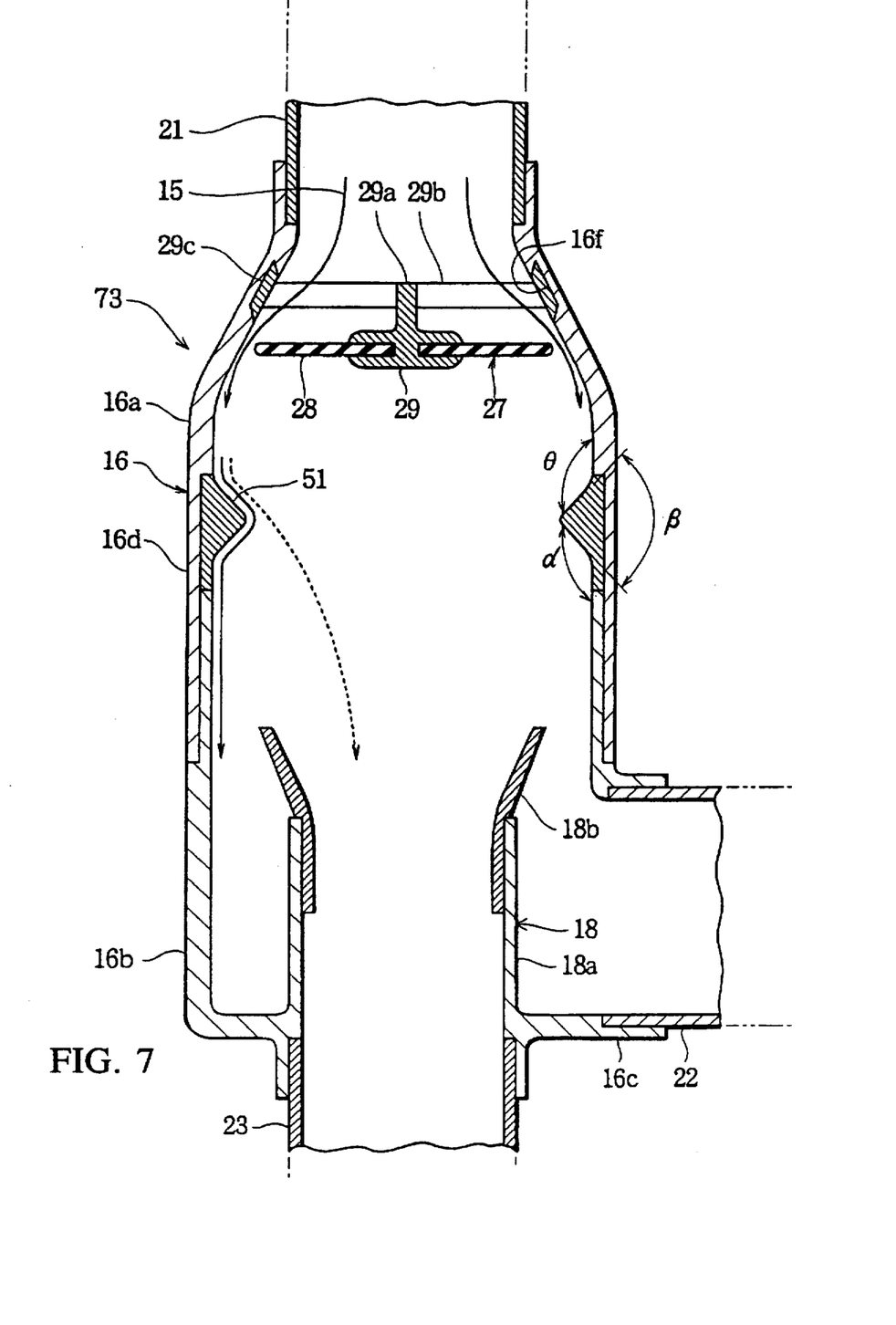
FIG. 7 is sectional view of the third embodiment of the present invention corresponding to FIG. 1.

Furthermore, as shown in FIGS. 1, 6 and 7, a current piece 27 can be disposed in the outer pipe 16 above the flow-separating piece 24 or the protrusion 51 apart from the inner circumferential surface of the outer pipe 16, and the current piece 27 can be adapted to make the rainwater 15 flowing into the outer pipe 16 from the rainwater flow passage 11 to adhere and flow on the inner circumferential surface of the outer pipe 16.

Moreover, as shown in FIG. 7, a third flowing-down rainwater flow-separating pipe 73 according to the present invention comprises an outer pipe 16 having a vertical portion 16d, connected at an upper end thereof to a rainwater flow passage 11 for receiving rainwater 15 dropping on a roof or a housetop of a building, connected at a lower end thereof to a water collecting box 14 communicating with a sewer pipe, an inner pipe 18 arranged apart from an inner circumferential surface of the vertical portion 16d at an outer circumferential surface of an upper portion thereof, and connected at a lower end thereof to any one of both of a storage-percolating box or a storage vessel, and a ring-like protrusion 51 disposed on a inner circumferential surface of the vertical portion 16d of the outer pipe 16 upward by a predetermined distance from an upper end of the inner pipe 18.

The characteristic construction resides in that a current piece 27 can be disposed in the outer pipe 16 above the protrusion 51 apart from the inner circumferential surface of the outer pipe 16, and the current piece 27 can be adapted to make the rainwater 15 flowing into the outer pipe 16 from the rainwater flow passage to adhere and flow on the inner circumferential surface of the outer pipe 16.

BEST MODE FOR CARRYING OUT THE INVENTION

The first embodiment of the invention will be described hereinafter with reference to the drawings.

As shown in FIGS. 1 to 5, a gutter 11 is disposed along a circumferential edge of a roof of a building, and receives rainwater 15 dropping on the roof. A sort pipe 12 is disposed downward in the vertical direction on an under surface of the gutter 11 integrally with the gutter 11, and a flow-separating pipe 13 is connected to the short pipe 12 through a relatively short first pipe 21. The flow-separating pipe 13 comprises an outer pipe 16 connected to a low end of the first pipe 21 at an upper end thereof and connected to a water collecting box 14 through a second pipe 22 at a lower end side portion, and an inner pipe 18 inserted into the outer pipe 16 from a lower surface of the outer pipe 16 at an upper portion thereof and connected to a storage-percolating box 17 through a third pipe 23 at a lower end thereof (FIG. 5). The flow-separating pipe 13 is made a vinyl chloride resin in this embodiment.

As shown in detail in FIG. 1, the outer pipe 16 has an upper portion case 16a connected to a lower end of the first pipe 21 at an upper end thereof, and a lower portion case 16b connected to the third pipe 23 at a lower end thereof. A horizontal pipe 16c is disposed so as to protrude at a lower end side portion of the lower portion case 16b, and an upper end of the second pipe 22 is connected to the horizontal pipe 16c. A vertical portion 16d of the outer pipe 16 is formed by the upper portion case 16a and the lower portion case 16b except the horizontal pipe 16c. The inner pipe 18 has an inner pipe main body 18a formed integrally with the lower portion case 16d of the lower portion case 16b, and a funnel 18b formed so as to broaden toward the upper end and inserted into the upper end of the inner pipe main body 18a. The inner pipe main body 18a is arranged in such a manner that an outer circumferential surface of the upper portion of the inner pipe main body 18a positioned in the lower portion case 16b is spaced apart from an inner circumferential surface of the vertical portion 16d of the outer pipe 16. More specifically, a center line of the inner pipe main body 18a is made to coincide with a center line of the vertical portion 16d, an outer diameter of the upper portion of the inner pipe main body 18a is made smaller than an inner diameter of the vertical portion 16d. In this specification, the upper portion of the inner pipe 18 means an upper end of the funnel 18b inserted into the upper end of the inner pipe main body 18a.

Figure 2:
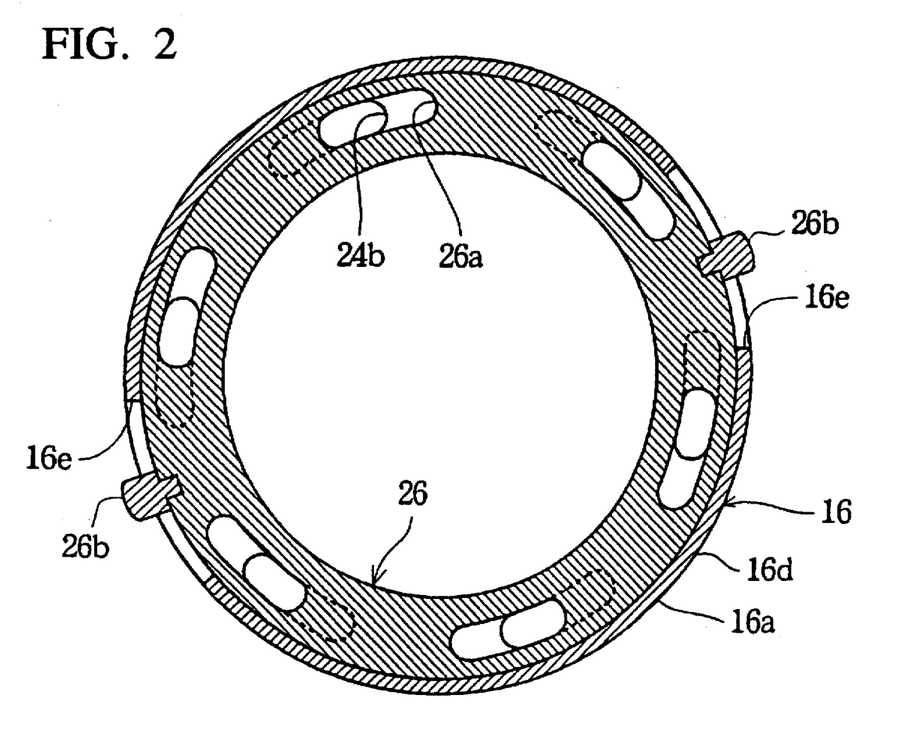
FIG. 2 is a sectional view taken along the line B—B of FIG. 1.

A ring-like flow-separating piece 24 is inserted into the inner circumferential surface of the vertical portion 16d of the outer pipe 16 which is located above the upper end of the inner pipe 18 by a predetermined distance. The flow-separating piece 24 comprises a ring-like concave groove 24a formed on an upper surface of the flow-separating piece (FIG. 1), a plurality of through holes 24b formed on a bottom portion of a concave groove 24a so as to be juxtaposed in a circumferential direction (FIGS. 1 and 2), and an inner circumferential wall 24c formed in such a taper as that an inner diameter thereof becomes smaller toward the lower end (FIG. 1). The concave groove 24a is adapted to receive the rainwater 15 flowing down along the inner circumferential surface of the vertical portion 16d of the outer pipe 16. A plurality of through holes 24b is adapted to guide the rainwater 15 received in the concave groove 24a to the water collecting box 14. Further the inner circumferential wall 24c is adapted to guide the rainwater 15 overflowing from the concave groove 24a to the inner pipe 18. A plurality of through holes 24b are six arc-like through holes in this embodiment, and these through holes 24b are formed so as to be juxtaposed apart from each other by a predetermined distance along the concave groove 24a (FIG. 2).

A slit 24d crossing the vent holes 24b in the circumferential direction is formed on the flow-separating piece 24. the flow-separating piece 24 is divided into two of an upper part and a lower part by the slit 24d. An adjusting ring 26 is inserted rotatably into this slit 24d (FIG. 1). The adjusting ring 26 comprises six through holes 26a each of which is identical in shape and size with each of the six through holes 24b, and a pair of operating levers 26b, 26b disposed on the outer circumferential surface so as to protrude outward the outer pipe 16 (FIGS. 1 and 2). A pair of the operating levers 26b and 26b protrude from a pair of lever slits 16e and 16e formed on the outer pipe 16 so as to extend in the circumferential direction. When the operating lever 26b is abutted to one end portion of the lever slit 16e, the hole 26a coincides with the hole 24b, so that the opening ratio of the through holes 24b becomes 100%. Also, when the operating lever 26b is abutted to the other end portion of the lever slit 16e, the hole 26a does not coincide with the through hole 24b at all, so that the opening ratio of the through hole 24b becomes 0%. The flow-separating piece 24 divided into two of the upper part and the lower part are fixed to the outer pipe 16 by an adhesive or screws and the like (not shown) in such a manner that the through holes 24b divided into two of the upper part and the lower part do not shift with each other.

Figure 3:
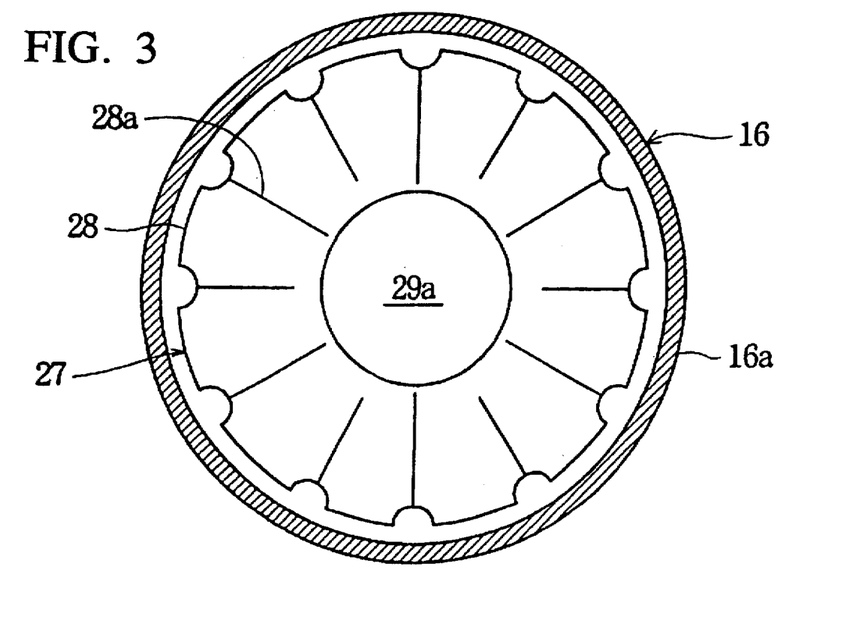
FIG. 3 is a sectional view taken along the line C—C of FIG. 1.
Figure 4:
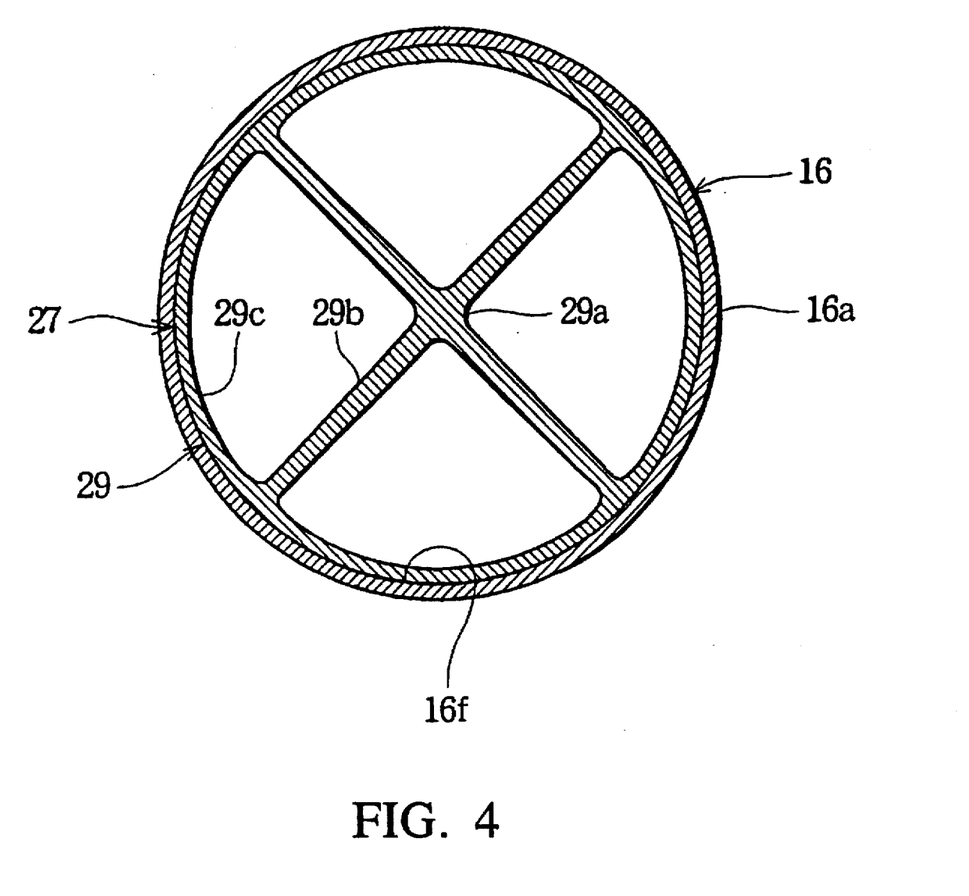
FIG. 4 is a sectional view taken along the line D—D of FIG. 1.

Further, a current piece 27 is disposed in the outer pipe 16 above the flow-separating piece 24 apart from the inner circumferential surface of the outer pipe 16. The current piece 27 comprises a current piece main body 28 formed by a soft rubber plate which deflects relatively easily, and a supporting piece 29 for supporting the current piece main body 28 (FIGS. 1, 3 and 4). Splits 28a extending in the radial direction at predetermined angular-distance are formed at the current piece main body 28 (FIG. 3). The supporting piece 29 comprises a shaft 29a for holding a center of the current piece main body 28, and a holding ring 29c for holding the shaft 29a through four ribs 29b shaped in a cross (FIG. 4). The holding ring 29c is inserted into a ring groove 16f formed on the inner circumferential surface of the outer pipe 16. The current piece 27 is adapted to make the rainwater 15 flowing from the gutter to the outer pipe 16 to adhere and flow on the inner circumferential surface of the outer pipe 16. Also, the water collecting box 14 and the storage-percolating box 17 are buried in the earth, respectively. The water collecting box 14 is connected to the sewer pipe (not shown), and gravel or earth 30 having relative large particle diameter is arranged under the storage-percolating box 17 in order to make it easy to percolate the stored rainwater 15 (FIG. 5).

An operation of thus constructed flow-separating pipe of the flowing-down rainwater will be described.

On the light rain at the beginning of the raining, the rainwater 15 flows down along the short pipe 12 and the first pipe 21 from the gutter 11 together with the sand and the dust accumulated on the roof (not shown). On this occasion, the rainwater 15 flows down through a center of the first pipe 21 without adhering to the first pipe 21 since the first pipe is relatively short. However, as shown by an arrow of a solid line in FIG. 1, the rainwater 15 drops on the upper surface of the current piece 27 to be guided onto the inner circumferential surface of the outer pipe 16 by the current piece 27, to thereby flow down in a laminate manner as an adhering flow which adheres to the inner circumferential of the outer pipe 16. The rainwater 15 which is made into the adhering flow to the outer pipe 16 is stored in the concave groove 24a of the flow-separating piece 24. However, since an amount of the flow of the rainwater 15 is small, all of the rainwater 15 flow into the sewer pipe (not shown) via the through holes 24b, the horizontal pipe 16c, the second pipe 22 and the water collecting box 14 as shown by an arrow of a broken line in FIG. 1 and an arrow of a broken line in FIG. 5. As a result, since the rainwater 15 including much sand and dust flows only in the outer pipe 16 and does not flow in the inner pipe 18, gaps of the particles of the earth 30 under the storage-percolating box 17 is not blinded by the sand and the dust included in the rainwater 15. Also, an amount per one hour of the rainwater 15 flowing into the sewer pipe increases as the strength of the raining increases.

When the strength of the raining increases to be a middle rain, the rainwater 15 flowing into the flow-separating pipe 13 is flow-separating into the rainwater 15 passing through the through holes 24b as shown by the arrow of the broken line in FIG. 1, and the rainwater 15 overflowing from the concave groove 24a and flowing into the inner pipe 18 along the inner circumferential wall as shown by the two-dot chain line in FIG. 1. The rainwater 15 passing through the through hole 24b flows into the sewer pipe through the horizontal pipe 16c, the second pipe 22 and the water collecting box 14 as shown in the arrow of the broken line in FIG. 5, and the rainwater 15 flowing into the inner pipe 18 is temporarily stored in the storage-percolating box 17 through the third pipe 23 as shown by an arrow of two-dot chain line in FIG. 5. Further, since these rainwater 15 hardly include the sand and the dust and relatively clean, the gaps between the particles of the earth 30 under the storage-percolating box 17 are not blinded, the rainwater 15 stored in the storage-percolating box 17 is made into the underground water. Also, an amount per one hour of the rainwater 15 flowing to the sewer pipe is not changed even if the strength of the raining increases.

Also, when the strength of the raining does not increase and the light rain continues, the opening ratio of the through holes 24b is decreased by operating the operating lever 26b of the adjusting ring 26. As a result, in spite of the light rain, the rainwater 15 overflows from the concave groove 24a to flow into the inner pipe 18, the relatively clean rainwater 15 which hardly include the sand and the dust is temporarily stored in the storage-percolating box 17.

FIG. 6 shows a second embodiment of the invention. In FIG. 6, the same reference numerals show the same components as those of FIG. 1.

In this embodiment, a ring-like protrusion 51 is inserted into the inner circumferential surface of the outer pipe 16 above the upper end of the inner pipe 18 of the flow-separating pipe 53 by a predetermined distance, and a ring-like flow-separating piece 24 which is the same as that of the first embodiment is inserted into the inner circumferential surface of the vertical portion 16d of the outer pipe 16 above the upper end of the inner pipe 18 and below the protrusion 51. The protrusion 51 is formed in such a manner that an angle θ contained between the upper surface thereof and the inner circumferential surface of the outer pipe 16 is of 120° and the sectional contour of the protrusion 51 is in substantially triangle. On this occasion, an angle β of a leading end of the protrusion 51 is of 60°. The leading end of the protrusion 51 is formed in the convex curved surface. The above-mentioned angle θ=120° is suitable to the case in which water-control countermeasure is of account in a region in which houses are crowed and there are many paved roads. Also, similarly to the first embodiment, a slit 24d is formed on the flow-separating piece 24, and the adjusting ring 26 is inserted rotatably into the slit 24d, and further the current piece 27 is disposed above the protrusion 51.

An operation of thus constructed flow-separating pipe of the flowing-down rainwater will be described.

On the light rain at the beginning of the raining, the rainwater 15 flows into the flow-separating pipe 53 from the gutter (not shown) through the short pipe (not shown) and the first pipe 21 together with the sand and the dust accumulated on the roof (not shown), guided by the current piece 27 to flow in a laminate manner as an adhering flow of the outer pipe 16. This rainwater 15 flows down in the laminate manner while it adheres to the inner circumferential surface of the vertical portion 16d as it is as shown by an arrow of a solid line after it rides across the protrusion 51 of the inner circumferential surface of the outer pipe 16, and then it flows into the sewer pipe (not shown) via the through holes 24a of the flow-separating piece 24, the horizontal pipe 16c, the second pipe 22 and the water collecting box (not shown).

When the strength of the raining increases to be a middle rain, the rainwater 15 flowing into the flow-separating pipe 53 is flow-separated into the adhering flow of a constant amount flowing down while it adheres to the inner circumferential surface of the vertical portion 16d as it is even if it rides across the protrusion 51 as shown by the arrow of the solid line, and the separating flow jumping at the protrusion 51, separating from the inner circumferential surface of the vertical portion 16d and flowing into the inner pipe 18. The rainwater 15 riding across the protrusion 51 to be the adhering flow is flow-separated into the one flowing into the sewer pipe through the through holes 24b of the flow-separating piece 24, the horizontal pipe 16c, the second pipe 22 and the water collecting box as shown by the arrow of the solid line, and the one overflowing from the concave portion 24a of the flow-separating piece 24 to flow into the inner pipe 18 as shown by the arrow of two-dot chain line. The rainwater 15 which is made into the separating flow at the protrusion 51 is temporarily stored in the storage-percolating box (not shown) through the inner pipe 18 and the third pipe 23.

When the strength of the raining becomes further larger to be a heavy rain, all of the rainwater 15 flowing into the flow-separating pipe 53 jump at the protrusion 51 to separate from the inner circumferential surface of the vertical portion 16d, and flows smoothly into the inner pipe 18. This rainwater 15 is temporarily stored in the storage-percolating box to made into the underground water. As a result, the rainwater 15 dropping on the roof of the building does not flow into the sewer pipe at all, an amount per one hour of the rainwater 15 flowing into the sewer pipe decreases drastically, so that the amount of the rainwater 15 flowing to the sewer pipe does not exceed the flowing ability thereof.

FIG. 7 shows the third embodiment. In FIG. 7 the same reference numeral as that of FIG. 6 show the same components as those of FIG. 6.

In this embodiment, a ring-like protrusion 51 which is the same as that of the second embodiment is disposed on the inner circumferential surface of the vertical portion 16d of the outer pipe 16 above the upper end of the inner pipe 18 of the flow-separating pipe 73 by a predetermined distance, and the current piece 27 which is the same as those of the first and the second embodiments is disposed in the outer pipe 16 above the protrusion 51 apart from the inner circumferential surface of the outer pipe 16.

The operation of thus constructed flow-separating pipe of the flowing rainwater is substantially the same as that exhibited in a case where the flow-separating piece is eliminated in the second embodiment, so that the explanation thereof will be omitted, so that repeat explanation is prevented.

Moreover, the lower end of the inner pipe is connected to the storage-percolating box through the third pipe in the first embodiment, however, that is one example, so that the lower end of the inner pipe may be connected to the storage vessel through the third pipe. In a case where the storage vessels stacked in plural in the vertical direction are used, these storage vessels are communicated with each other by an overflow pipe and a supplying pipe, and a non-return valve is disposed on the supplying pipe, so that the rainwater is stored from the uppermost storing vessel, and the rainwater stored in the storage vessel in turn and the rainwater stored in the storage vessels is used from the uppermost storage vessel when used as the water sprinkling to the garden, the washing water for the car and the general service water for the toilet and the like. As a result, the potential energy of the rainwater stored in the storage vessel is used effectively. Further, an overflow pipe of the lower most storage vessel is connected to the storage-percolating box, so that the rainwater can be used further effectively.

Also, in the above-mentioned first to third embodiments, since the first pipe is short, the current piece is disposed in the outer pipe above the flow-separating piece or the protrusion, and the rainwater flowing into the outer pipe adheres to the inner circumferential surface of the outer pipe by the current piece. However, if the first pipe can be made longer fully, the rainwater adheres to the inner circumferential surface naturally, so that the current piece becomes useless.

Also, in the second and the third embodiments, angles θ and α contained between the upper and lower surfaces of the protrusion and the inner circumferential surfaces of the vertical portion are made 120° respectively, thereby the water-control countermeasure is of account in a region in which houses are crowed and there are many paved roads. However, the counter of the protrusion is not restricted thereto. In a case where the storing of the underground water and the general service water use of the rainwater are main purposes, the angles θ and α are made into 90° respectively, and the leading end of the protrusion may be formed in a convex curved surface. According to thus constructed protrusion, when the strength of the raining is made into a degree of a middle rain, the main part of the rainwater flowing into the flow-separating pipe jumps at the protrusion, separates from the inner circumferential surface of the vertical portion and is stored in the storage-percolating box and the storage vessel through the inner pipe. As a result, the rainwater stored in the storage-percolating box is percolated in the earth and stored as the underground water, the rainwater stored in the storage vessel is used as the general service water. Also, the angles θ and α according to the invention are not restricted to the above-mentioned angles, the angle θ can be changed suitably according to the ratio of the area of the construction and the paved roads to the total area of the region or the configuration of the ground and the like. When the water-control countermeasure is of account, the angle θ is made large, and when the storage of the underground water and the general service water use of the rainwater are of account, the angle θ is made small.

Also, in the above-mentioned embodiments, the flow passage of the rainwater is the gutter disposed on the circumferential edge of the roof of the construction, however, it is not restricted thereto, so that it may be an concave groove for the rainwater disposed on the circumferential edge of the roof of the building.

Further, in the above-mentioned embodiments, the funnel is inserted into the upper end of the inner pipe. However, if the rainwater which jumps at the protrusion can flow into the inner pipe without the funnel, the becomes useless.

As described above, according to the invention, a ring-like flow-separating piece is disposed on the inner circumferential surface of the vertical portion of the outer pipe above an upper end of the inner pipe by a predetermined distance, the flow-separating piece comprises a ring-like concave groove for receiving the rainwater flowing down along the inner circumferential surface of the vertical portion of the outer pipe, a plurality of through holes formed on a bottom portion of the concave groove so as to be juxtaposed in a circumferential direction for guiding the rainwater received in the concave groove to the water collecting box, and an inner circumferential wall formed in such a taper as that an inner diameter thereof decreases toward the lower end for guiding the rainwater overflowing from the concave groove to the inner pipe. Accordingly, on the light rain at the beginning of the raining, all of the rainwater including much sand and dust accumulated on the roof of the building flows into the sewer pipe through the through holes of the flow-separating piece, so that the contaminated rainwater into the storage vessel can be prevented.

Also, when the strength of the raining increases, the rainwater overflowing from the convex groove of the flow-separating piece is guided to the inner pipe along the inner circumferential wall to flow into the storage-percolating box, so that the amount of the rainwater flowing into the sewer pipe and the rivers can be prevented from exceeding the flowing capacity thereof.

Further, if the ring-like protrusion is disposed on the inner circumferential surface of the vertical portion of the outer pipe above the upper end of the inner pipe by the predetermined distance, and the ring-like flow-separating piece is disposed on the inner circumferential surface of the vertical portion of the outer pipe above the upper end of the inner pipe and below the protrusion, the rainwater jumps at the protrusion to be guided in the inner pipe smoothly when the flow rate of the rainwater flowing down in the outer pipe is larger than a predetermined value.

Besides, if the slit crossing the through holes in the circumferential direction is formed on the flow-separating piece, and the adjusting ring which can adjust the opening ratio of the through holes is inserted rotatably into the slit, the amount of the rainwater passing through the through holes of the flow-separating piece can be adjusted. Accordingly, in a case where the light rain continues after the sand and the dust accumulated on the roof and the housetop flows away, the rainwater overflowing from the concave portion increases by making the opening ratio of the through holes smaller, and then the rainwater is guided to the inner pipe along the inner circumferential wall to flow into the storage-percolating box and the storage vessel.

Moreover, if the current piece is disposed in the outer pipe above the flow-separating piece or the protrusion apart from the inner circumferential surface of the outer pipe, and the current piece is adapted to make the rainwater flowing from the rainwater flow passage to the outer pipe to adhere and flow on the inner circumferential surface of the outer pipe, the rainwater can adhere to the inner circumferential surface of the outer pipe even if the distance between the rainwater flow passage and the flow-separating pipe is short. As a result, the rainwater flowing down in the outer pipe can be flow-separating surely by the flow-separating piece or the protrusion.

INDUSTRIAL APPLICABILITY

The flowing-down rainwater flow-separating pipe according to the invention flow-separates the rainwater dropping on the roof or the housetop of the building into the rainwater flowing down into the sewer pipe and the rainwater stored in the storage-percolating box or the storage vessel. Therefore, the amount of the rainwater flowing into the sewer pipe and the rivers is prevented from exceeding the flowing capacity thereof.

We claim:

1. A flowing-down rainwater flow-separating pipe (13) comprising:

an outer pipe (16) having a vertical portion (16d), connected at an upper end thereof to a rainwater flow passage (11) for receiving rainwater (15) dropping on a roof or a housetop of a building, and connected at a lower end thereof to a water collecting box (14) communicating with a sewer pipe, an inner pipe (18) arranged apart from an inner circumferential surface of the vertical portion (16d) at an outer circumferential surface of an upper portion thereof, and connected at a lower end thereof to any one of both of a storage-percolating box (17) for rainwater (15) or a storage vessel, and a ring-like flow-separating piece (24) disposed on the inner circumferential surface of the vertical portion (16d) of the outer pipe (16) above an upper end of the inner pipe (18) by a predetermined distance, wherein the flow-separating piece (24) comprises:

a ring-like concave groove (24a) for receiving the rainwater (15) flowing down along the inner circumferential surface of the vertical portion (16d) of the outer pipe (16);

a plurality of through holes (24b) formed on a bottom portion of the concave groove (24a) so as to be juxtaposed in a circumferential direction for guiding the rainwater (15) received in the concave groove (24a) to the water collecting box (14); and an inner circumferential wall (24c) formed in such a taper as that an inner diameter thereof decreases toward the lower end for guiding the rainwater (15) overflowing from the concave groove (24a) to the inner pipe (18).

2. A flowing-down rainwater flow-separating pipe according to claim 1, wherein a slit (24d) crossing the through holes (24b) in the circumferential direction is disposed on the flow-separating piece (24), and an adjusting ring (26) which can adjust an opening ratio of the through holes (24b) is inserted rotatably into the slit (24d).

3. A flowing-down rainwater flow-separating pipe according to claim 2, wherein a current piece (27) is disposed in the outer pipe (16) above the flow-separating piece (24) apart from the inner circumferential surface of the outer pipe (16), and the current piece (27) forms means to make the rainwater (15) flowing into the outer pipe (16) from the rainwater flow passage (11) to adhere and flow on the inner circumferential surface of the outer pipe (16).

4. A flowing-down rainwater flow-separating pipe according to claim 1, wherein a current piece (27) is disposed in the outer pipe (16) above the flow-separating piece (24) apart from the inner circumferential surface of the outer pipe (16), and the current piece (27) forms means to make the rainwater (15) flowing into the outer pipe (16) from the rainwater flow passage (11) to adhere and flow on the inner circumferential surface of the outer pipe (16).

5. A flowing-down rainwater flow-separating pipe (53) comprising an outer pipe (16) having a vertical portion (16d), connected at an upper end thereof to a rainwater flow passage (11) for receiving rainwater (15) dropping on a roof or a housetop of a building, and connected at a lower end thereof to a water collecting box (14) communicating with a sewer pipe, an inner pipe (18) arranged apart from an inner circumferential surface of the vertical portion (16d) at an outer circumferential surface of an upper portion thereof, and connected at a lower end thereof to any one or both of a storage-percolating box for rainwater (15) or a storage vessel, and a ring-like protrusion (51) disposed on the inner circumferential surface of the vertical portion (16d) of the outer pipe (16) above an upper end of the inner pipe (18) by a predetermined distance, wherein a ring-like flow-separating piece (24) is disposed on the inner circumferential surface of the vertical portion (16d) of the outer pipe (16) above an upper end of the inner pipe (18) and below the protrusion (51), wherein the flow-separating piece (24) comprises:

a ring-like concave groove (24a) for receiving the rainwater (15) flowing down along the inner circumferential surface of the vertical portion (16d) of the outer pipe (16);

a plurality of through holes (24b) formed on a bottom portion of the concave groove (24a) so as to be juxtaposed in a circumferential direction for guiding the rainwater (15) received in the concave groove (24a) to the water collecting box; and an inner circumferential wall (24c) formed in such a taper as that an inner diameter thereof decreases toward the lower end for guiding the rainwater (15) overflowing from the concave groove (24a) to the inner pipe (18).

6. A flowing-down rainwater flow-separating pipe according to claim 5, wherein a slit (24d) crossing the through holes (24b) in the circumferential direction is disposed on the flow-separating piece (24), and an adjusting ring (26) which can adjust an opening ratio of the through holes (24b) is inserted rotatably into the slit (24d).

7. A flowing-down rainwater flow-separating pipe according to claim 6, wherein a current piece (27) is disposed in the outer pipe (16) above the flow-separating piece (24) or the protrusion (51) apart from the inner circumferential surface of the outer pipe (16), and the current piece (27) forms means to make the rainwater (15) flowing into the outer pipe (16) from the rainwater flow passage (11) to adhere and flow on the inner circumferential surface of the outer pipe (16).

8. A flowing-down rainwater flow-separating pipe according to claim 5, wherein a current piece (27) is disposed in the outer pipe (16) above the flow-separating piece (24) or the protrusion (51) apart from the inner circumferential surface of the outer pipe (16), and the current piece (27) forms means to make the rainwater (15) flowing into the outer pipe (16) from the rainwater flow passage (11) to adhere and flow on the inner circumferential surface of the outer pipe (16).

9. A flowing-down rainwater flow-separating pipe (73) comprising an outer pipe (16) having a vertical portion (16d), connected at an upper end thereof to a rainwater flow passage (11) for receiving rainwater (15) dropping on a roof or a housetop of a building, and connected at a lower end thereof to a water collecting box communicating with a sewer pipe, an inner pipe (18) arranged apart from an inner circumferential surface of the vertical portion (16d) at an outer circumferential surface of an upper portion thereof, and connected at a lower end thereof to any one or both of a storage percolating box or a storage vessel, and a ring-like protrusion (51) disposed on the inner circumferential surface of the vertical portion (16d) of the outer pipe (16) above an upper end of the inner pipe (18) by a predetermined distance.

wherein a current piece (27) is disposed in the outer pipe (16) above the protrusion (51) apart from the inner circumferential surface of the outer pipe (16), and the current piece (27) forms means to flow the rainwater (15) flowing into the outer pipe (16) from the rainwater flow passage (11) to adhere and flow on the inner circumferential surface of the outer pipe (16).

* * * * *